No. 662,306. Patented Nov. 20, 1900.
A. L. RIKER.
POWER TRANSMITTING DEVICE.
(Application filed Jan. 18, 1900.)
(No Model.) 2 Sheets—Sheet 1.
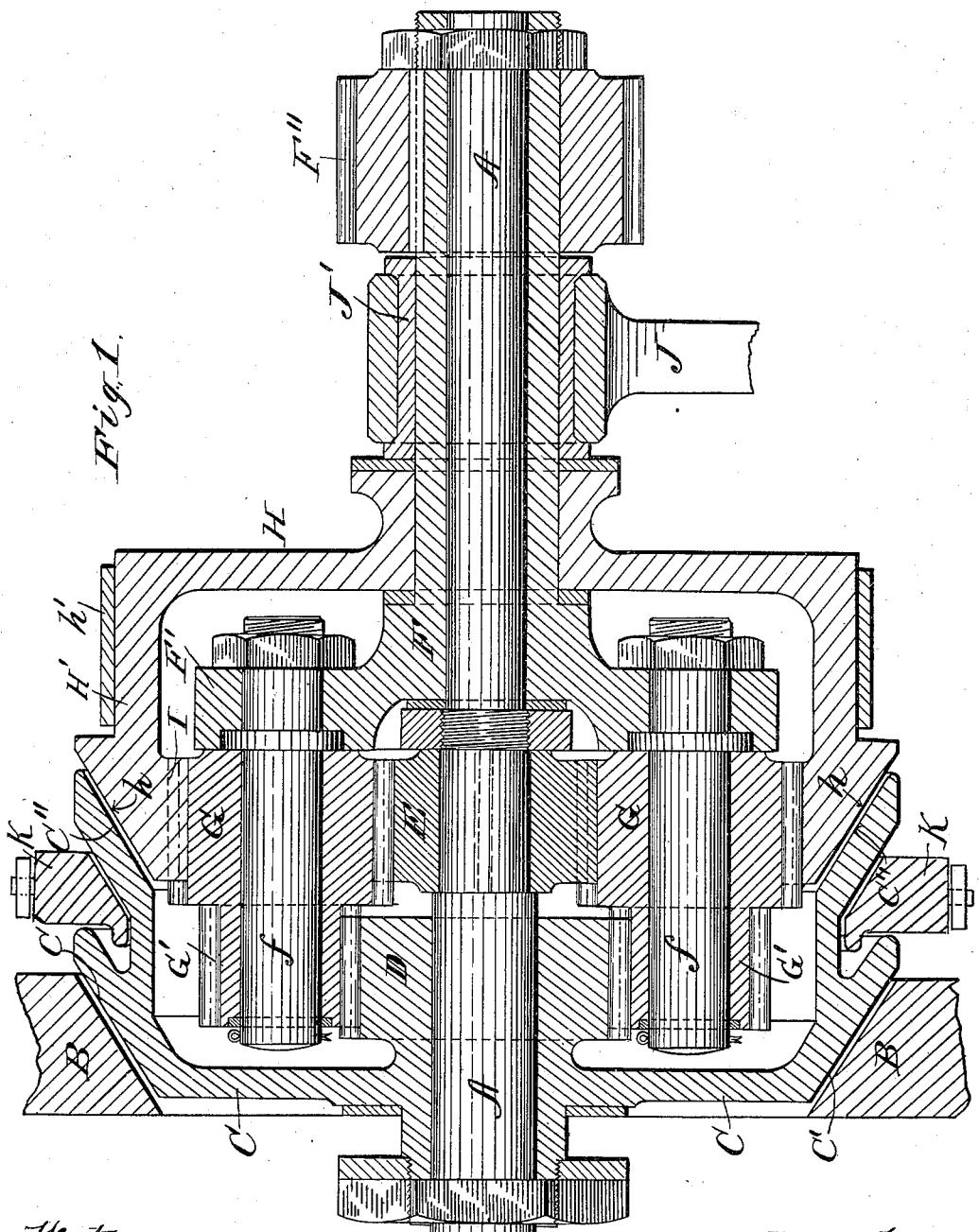

No. 662,306. Patented Nov. 20, 1900.
A. L. RIKER.
POWER TRANSMITTING DEVICE.
(Application filed Jan. 18, 1900.)
(No Model.) 2 Sheets—Sheet 2.

Witnesses.
W. B. Edrler.

Inventor
Andrew L. Riker
by Philip Mauro
his Atty

UNITED STATES PATENT OFFICE.

ANDREW L. RIKER, OF NEW YORK, N. Y.

POWER-TRANSMITTING DEVICE.

SPECIFICATION forming part of Letters Patent No. 662,306, dated November 20, 1900.

Application filed January 18, 1900. Serial No. 1,884. (No model.)

*To all whom it may concern:*

Be it known that I, ANDREW L. RIKER, a citizen of the United States, and a resident of the city of New York, State of New York, have invented a new and useful Power-Transmitting Device, which is fully set forth in the following specification.

This invention relates to motor-vehicles in which the motor-shaft rotates in only one direction, and its objects are to afford means for driving the vehicle ahead at slow speed, but with increased power, as when starting or when climbing a hill, for going ahead at full speed, and for going backward. I accomplish these objects by providing a driving-pinion having connected therewith intermediate planetary gears that are actuated from the main shaft, but controlled either by an annular gear, which (when held stationary) revolves said driving-pinion ahead slowly, or by a clutch, which (when held fast) revolves said driving-pinion backward, or by locking said intermediate gears and driving-pinion to the main shaft, which last operation revolves the driving-pinion at full speed ahead.

Figure 3:
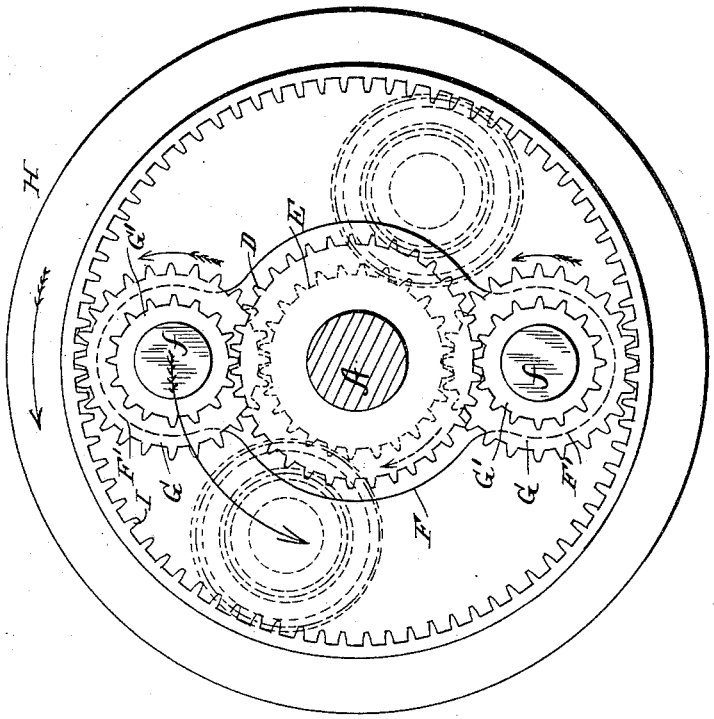
Figure 2:
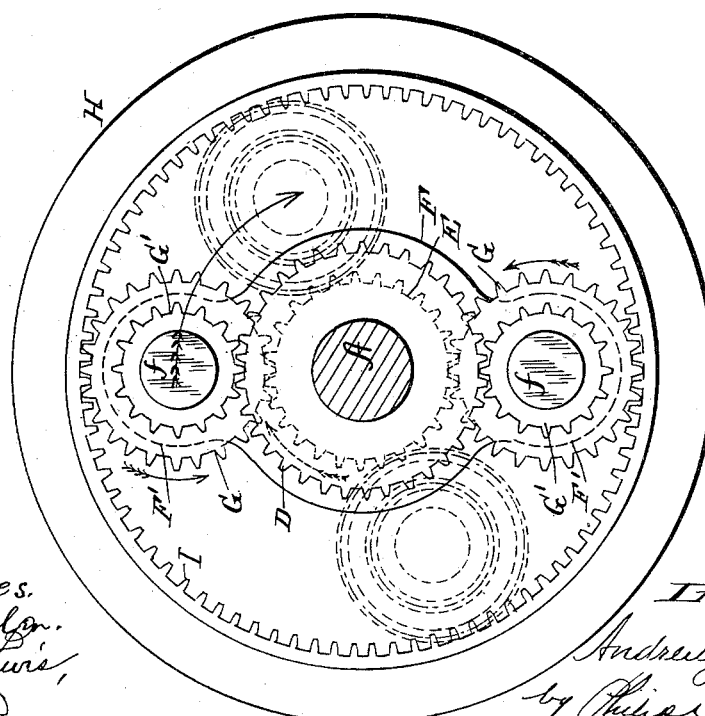

In the drawings, Figure 1 is a horizontal section showing the main shaft and the axles of the planetary gears in plan; and Figs. 2 and 3 are details viewed from the left in Fig. 1, the arrows indicating the directions of rotation.

A is the crank-shaft or main shaft of the engine extending through the engine-frame, part of the latter being shown at B B.

C C is a clutch-disk having the side flange that is provided with the conical clutch-surface C' C' and the conical clutch-surface C'' C''. Reversing-gear D is fast to the center of clutch C and may be integral therewith. The clutch, with its gear, turns freely on the main shaft, but is adapted to be held from rotation in any convenient manner, as by applying a brake-band or by shifting it so that clutch-surface C' C' will engage a corresponding surface on the engine-frame. For this purpose it has a slight longitudinal play on the shaft A. Main gear E, of smaller diameter than reversing-gear D, is fixed to the main shaft beyond gear D. The sleeve F, carrying at its inner end the plate or disk F', turns freely on shaft A beyond main gear E.

Studs *f* (preferably two) are carried on the plate F', and a planetary gear G, carrying the reduced portion G', is journaled on each stud. A disk H, having a hub and the flange H' H', turns freely upon sleeve F, flange H' being provided with surface *h h*, that conforms to the adjacent clutch-surface C'' C''. Provision is made for holding disk H stationary in any convenient manner, as by a brake-band *h' h'*, passing around the brake-surface or drum of flange H'. Around the interior of the flange of the disk H is the internal annular gear I, which meshes with planetary gears G. Planetary gears G mesh with main gear E and their reduced portions G' mesh with reversing-gear D.

J and J' show, respectively, a support and a bearing for the outer end of the device. Driving-pinion F'' is fixed on the outer end of sleeve F and meshes with a gear-wheel on the road wheel or axle. (Not shown.) Shaft A may extend throughout sleeve F, as shown, or it may terminate just beyond main gear E, in which case sleeve F may be solid.

Hereainfter for convenience I shall refer to clutch-disk C as the clutch, to plate F' as the transverse plate, and to disk H (with respect to its internal gear) as the annulus. Since all of the two-part planetary gears G G' operate alike, I shall consider only one two-part gear. As already stated, the main shaft A revolves in only one direction. The clutch may be held stationary or it may be locked to the annulus or it may be free to turn independently, and the annulus may be free or held fast. According as these parts are manipulated the device performs four different operations.

First. When the clutch and annulus are both free and the main shaft revolves, rotating main gear E, planetary gear G (with G') being free to rotate on its journal *f*, turns in a direction opposite to that of shaft A and at the same speed. Internal gear I turns at the same speed with planetary gear G and in the same direction—that is to say, in a direction opposite to that of shaft A. Clutch C is driven by the engagement of reduced gear G' with reversing-gear D in the same direction as shaft A and at a slower speed proportioned to the ratios of E and G and of G' and D, though it is at approximately the same speed. The result is that the annulus and clutch are turning idly in opposite directions.

Second. While the clutch is still free, suppose the annulus to be held fast, the main shaft revolves as before, main gear E turning planetary gear G. Since the annulus cannot move while gear G must revolve, the latter is forced around bodily, carrying its journal $f$ and with it transverse plate F' in the same direction that shaft A is turning, but more slowly and at a speed proportionate to the ratio of annular gear I to main gear E. The clutch of course turns idly in the same direction and at approximately the same speed as the main shaft. As transverse plate F' carries with it the driving-pinion F'', which revolves the road-wheel, the vehicle is driven ahead at slow speed. (See Fig. 2.)

Third. Suppose the clutch and the annulus are both (otherwise) free to turn, but are locked together, as by a key, or by the clutch being shifted and held against the annulus. As already observed, the tendency is for the clutch and the annulus to revolve in opposite directions. As a result the two clutch-surfaces C'' and $h$ become clamped firmly together and the clutch, the annulus, the planetary gears, and the transverse plate all turn together with the main gear E and the main shaft A—that is to say, the whole mechanism revolves as one, the planetary gears acting as keys, turning pinion F'', so as to drive the vehicle at full speed ahead.

Fourth. Suppose the clutch is held from rotation, the annulus being free to revolve as before. When the main shaft revolves, since the clutch and its reversing-gear D are stationary, the two-part planetary gear G G' being forced to revolve on its own journal, must also travel slowly backward, carrying its journal and transverse plate F' in a direction opposite to that of the main shaft and at approximately the same speed. The annulus turns idly in the same direction. The result of gear-plate F' turning backward is of course to drive the vehicle backward. (See Fig. 3.)

It is thus seen that according as these parts are manipulated—viz., as the annulus is, first, held fast, the clutch being free, or, the annulus being free as the clutch is, second, held fast, or is, third, locked to the annulus—the vehicle is either first driven ahead slowly, or, second, backward, or, third, at full speed ahead. These manipulations may be accomplished in various ways. The most convenient way of holding the annulus fast is by a brake-band, as in the drawings. The best way of holding the clutch fast is by a similar brake-band, though the drawings show how this may be done by having the clutch shifted, as by collar K, actuated by fork K', pivoted thereto at $k$, so that its surface C' may engage the engine-frame and the clutch may be locked to the annulus by an interposed key, but preferably by shifting the clutch, as already indicated. Many devices may be employed for manipulating these parts, but the simplest is a lever within convenient reach of the operator, so arranged that by moving it in one direction it applies the brake-band to hold the annulus stationary for slow speed ahead, while by moving it in the opposite direction it applies the brake-band to hold the clutch stationary for reversing the vehicle. A foot-lever may be employed to shift the clutch in the usual manner, forcing it against the annulus for full speed ahead. This may be accomplished, however, by further traverse of the lever.

The advantages of this construction, besides its simplicity and compactness, are that in going full speed ahead there are no cog-teeth to depend upon, no strain of the parts, and no necessity for transmitting power through various moving parts with the consequent loss by friction, while at other speeds the power is transmitted directly from one side to the other of the intermediate gears, which prevents any strain. Moreover, I have avoided the multiplicity of idle journals which render other speed-changing devices so short lived.

Having described my invention, I claim—

1. The combination with the main shaft of a unidirection motor and the main gear fast thereon, the disk and reversing-gear that turn freely on said shaft, and the driving sleeve or shaft loosely encircling said shaft, of a transverse plate at the inner end of said sleeve, the intermediate planetary gear journaled on said plate and meshing with said two first-named gears, an annulus turning freely on said sleeve and provided with internal teeth meshing with said planetary gear, means for holding said disk from rotation, means for holding said annulus from rotation, and means for locking said disk and said annulus together, substantially as described.

2. The combination with the main shaft of a unidirection motor and the main gear fast thereto, the disk and reversing-gear that turn freely on the main shaft and are capable of slight longitudinal play thereon inside of said main gear, and the driving-sleeve loosely encircling said shaft beyond said main gear, of a transverse plate at the inner end of said sleeve, the intermediate planetary gear journaled on said plate and meshing with said main gear and said reversing-gear, an annulus turning freely on said sleeve and provided with internal teeth meshing with said planetary gear, means for shifting said disk against said annulus, means for holding said disk from rotation and means for holding said annulus from rotation, substantially as described.

3. The herein-described power-transmitting device, the same consisting of the main shaft and the main gear fast thereon, the driving-shaft, the planetary gear carried upon the inner end thereof and meshing with said main gear, and two other gears each meshing with said planetary gear and arranged to be held stationary separately, and means for locking said two last-named gears together, whereby the driving-shaft is driven either forward at one of two speeds or backward, substantially as described.

4. The combination with the main shaft of a unidirection motor and the main gear fast thereon, the driving-shaft carrying at its inner end a transverse plate, and journaled on said plate a planetary gear (or gears) meshing with said main gear, of a revoluble annulus that meshes with said planetary gear, means to hold it from turning whereby said plate is caused to rotate bodily in order to revolve said driving-shaft at slow speed, a loosely-fitting reversing-gear on said main shaft also meshing with said planetary gear, means for holding it from turning whereby said plate is caused to rotate bodily in a direction opposite to that of the main shaft in order to reverse the driving-shaft, and means for locking said planetary gear to said main shaft in order to revolve said driving-shaft at full speed ahead, substantially as described.

5. In a power-transmitting device, the combination of the main shaft, a main gear fast thereon and a reversing-gear turning freely thereon, a driving-shaft carrying a transverse plate on its inner end, a planetary gear journaled on said plate and in mesh with said main gear, a reduced pinion carried by said planetary gear and in mesh with said reversing-gear, an annulus turning freely on said driving-shaft and carrying an internal gear in mesh with said planetary gear, means for holding said annulus stationary, to rotate the driving-shaft ahead, means for holding said reversing-gear stationary to reverse the driving-shaft, and means for locking said planetary gear to said main gear to rotate said driving-shaft at full speed ahead, substantially as described.

6. The combination of the main shaft, the main gear fast thereon and a reversing-gear turning freely thereon, a driving-shaft having a transverse plate on its inner end, a planetary gear journaled on said plate and in mesh with said main gear, a reduced pinion carried by said planetary gear and in mesh with said reversing-gear, an annulus turning freely on said driving-shaft and carrying internal gear in mesh with said planetary gear, means for holding said annulus stationary to drive the vehicle ahead, and means for holding said reversing-gear stationary to reverse the vehicle, substantially as described.

In testimony whereof I have signed this specification in the presence of two subscribing witnesses.

ANDREW L. RIKER.

Witnesses:
ELISHA K. CAMP,
C. A. L. MASSIE.